April 28, 1931. H. GLAENZER 1,803,244
TENDER TRUCK
Filed April 30, 1930 2 Sheets-Sheet 1

Inventor:-
Harry Glaenzer,
by his Attorneys,
Howson & Howson

April 28, 1931. H. GLAENZER 1,803,244
TENDER TRUCK
Filed April 30, 1930 2 Sheets-Sheet 2
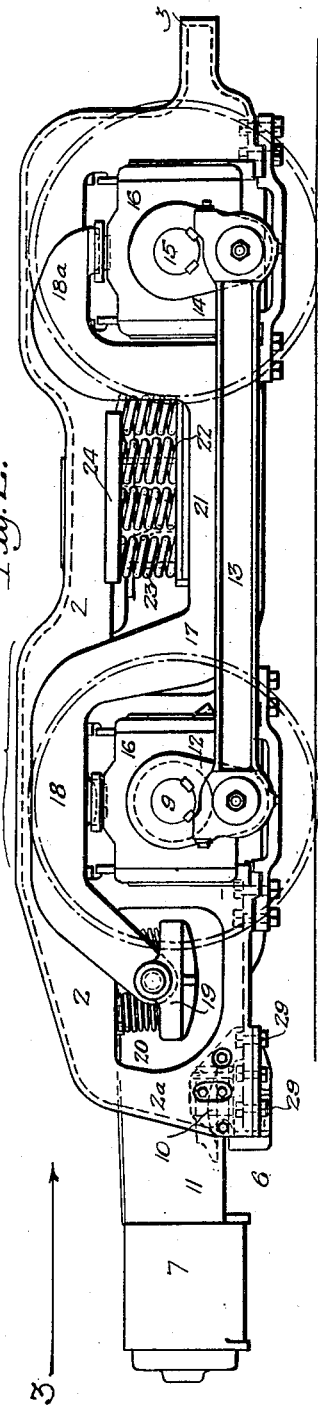
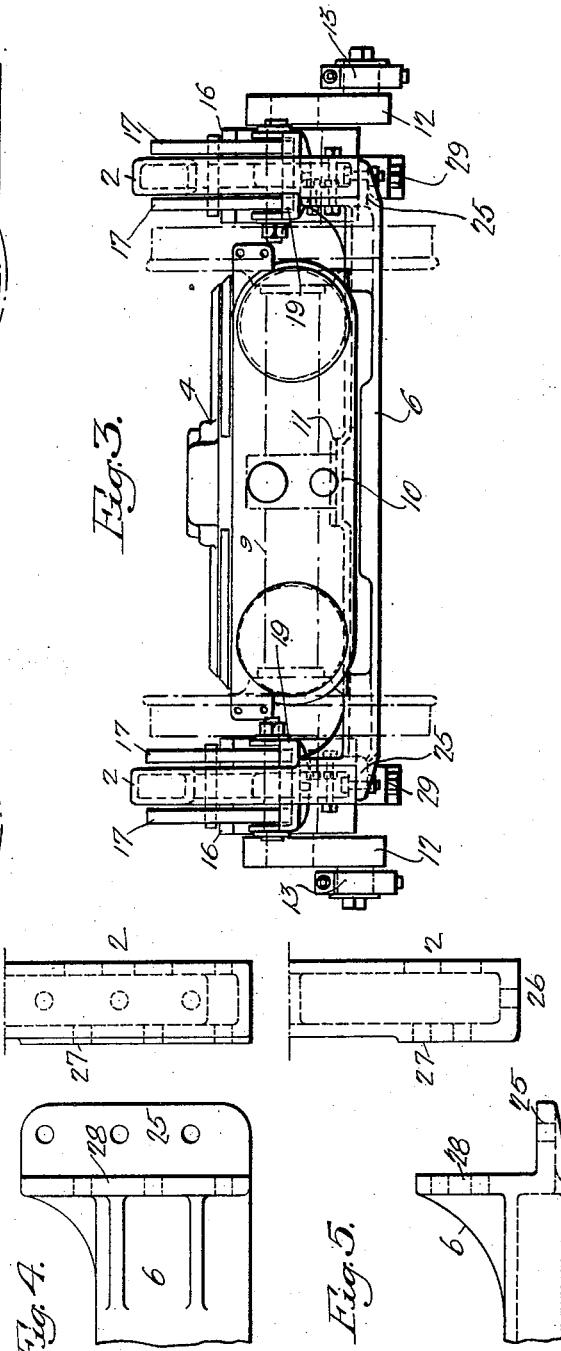
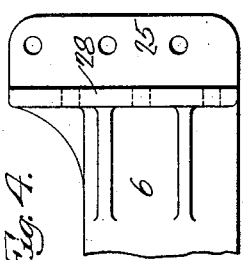
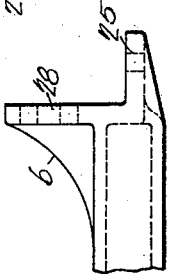
Inventor:-
Harry Glaenzer,
by his Attorneys,
Howson & Howson

UNITED STATES PATENT OFFICE

HARRY GLAENZER, OF PHILADELPHIA, PENNSYLVANIA

TENDER TRUCK

Application filed April 30, 1930. Serial No. 448,750.

My invention relates to certain improvements in trucks on which are carried boosting engines. The invention relates particularly to the trucks located under the tender of the locomotive.

The object of the invention is to provide a support for the overhanging portion of the booster which can be readily removed so that access may be had to the booster. Heretofore in this type of truck the transverse supporting rail was an integral part of the frame of the truck, and in order to gain access to the booster the tender had to be jacked up and the truck removed from under the tender. By my construction the transverse supporting rail can be readily detached to allow the motor and its pair of wheels to be dropped when placed over the conventional drop pit.

In the accompanying drawings:

Fig. 2 is a side view;

Fig. 3 is an end view looking in the direction of the arrow 3, Fig. 2;

Fig. 4 is a plan view of one end of the side frame and an end of the booster support separated; and Fig. 5 is an end view of the two parts separated as in Fig. 4.

Figure 1:
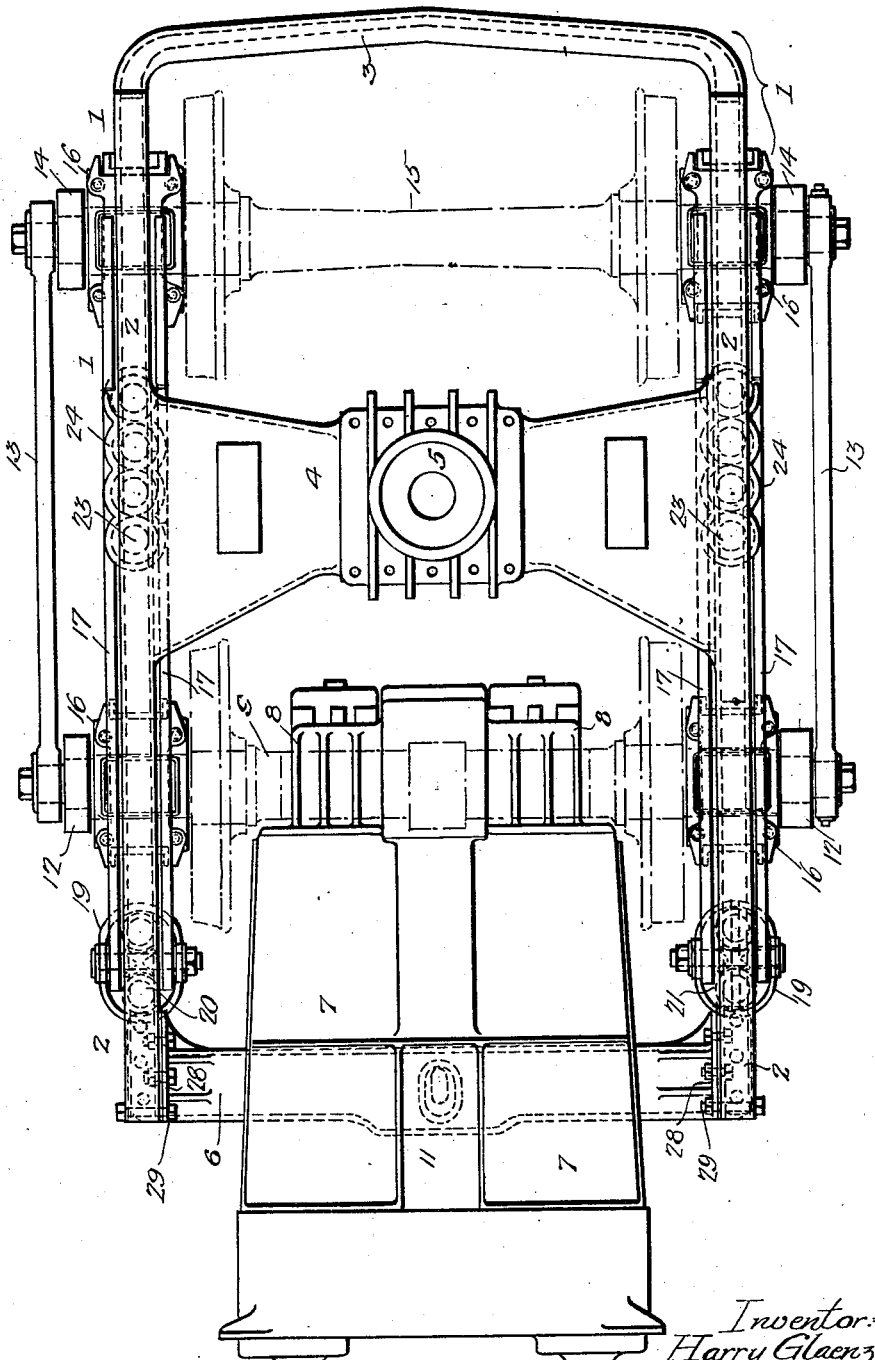
Fig. 1 is a plan view of a four-wheel truck with a booster mounted thereon and illustrating my invention.

While I have illustrated my invention in connection with a four-wheel truck, it will be understood that the invention can be applied to a six-wheel truck without departing from the spirit of the invention.

1 is the frame of the truck. In this instance the side members 2, the end member 3 and the bolster 4, including the center bearing 5, are made as an integral structure and form the frame 1. The end member 6 of the truck opposite the end member 3 is made detachable from the ends of the side members 2. This end member supports the overhanging portion of the booster engine 7, the inner end 8 of the booster engine being mounted on the axle 9 of the truck.

On the end member 6 is a rounded projection 10 on which fits the socket member 11 of the booster engine, so that the engine will accommodate itself to the axle which it drives through the ordinary driving mechanism of a booster engine.

In the present instance on each end of the axle 9 is a crank 12, which is connected by a rod 13 to the crank 14 on an axle 15. The two axles are mounted in boxes 16 of the ordinary type, which are adapted to the pedestals of the side frames 2. 17 are equalizing bars arranged in pairs, one pair being on one side of the truck and the other pair on the opposite side of the truck, and one bar on each pair being located on the outside of the side frame of the truck, while the other bar of each pair is located on the inside of each side frame as shown in Figs. 1 and 3.

The portions 18—18a extend over the boxes 16 and have projections resting upon the boxes. The end 18a of each beam terminates at the box, while the end 18 of each bar is extended over its box and down to a spring seat 19 to which it is pivoted, and springs 20 are mounted between the spring seat 19 and the underside of the upper portion of the frame 2. Equalizing bars are depressed at 21, and on the depressed portions of the pair of bars is a spring seat 22 on which is mounted a series of coil-springs 23 on which rest a spring seat 24 of each side frame 2.

The end member 6 must be firmly secured to the side members of the frame 1, as it supports the overhanging portion of the booster engine and must be so arranged that it can be quickly removed when repairs to the engine are necessary. Each end of the end member 6 has a horizontal portion 25 which extends under the portion 26 of the side frame 2, and on the inner side of the side frame 2 is a pad 27 against which fits the vertical portion 28 of the end member 6. In the end member and in the side members are vertical and horizontal openings for the securing bolts 29 which rigidly secure the end member 6 to the side members, and by detaching these bolts the end member can be readily dropped so that access may be had to the booster engines without jacking up the body of the tender or the car and without removing the truck from under the tender or car.

This application is a companion to an application filed by me for improvements in engine trucks on which boosters are mounted, said application being filed January 25, 1930, under Serial No. 423,472.

I claim:—

The combination in a car truck, of an integral frame consisting of two side members, an end member and a bolster, each free end of each side frame being shaped to form pads perforated for the reception of securing bolts; a detachable end member having a horizontal and a vertical portion at each end fitting the ends of the side members of the frame of the truck, and horizontal and vertical bolts securing said end frame to the integral side frames; axles on which the truck is mounted; and a booster engine pivotally mounted on the axle nearest the detachable end frame, the overhanging portion of the engine being supported by the detachable end frame.

HARRY GLAENZER.